United States Patent
Alam

(10) Patent No.: US 7,340,739 B2
(45) Date of Patent: Mar. 4, 2008

(54) AUTOMATIC CONFIGURATION OF A SERVER

(75) Inventor: Akm Kamrul Alam, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 632 days.

(21) Appl. No.: 10/609,362

(22) Filed: Jun. 27, 2003

(65) Prior Publication Data

US 2004/0267911 A1 Dec. 30, 2004

(51) Int. Cl.
*G06F 9/445* (2006.01)

(52) U.S. Cl. ...................................... 717/175

(58) Field of Classification Search ................ 717/110, 717/163–178; 713/1, 2, 100, 188, 108; 726/3, 726/24; 709/217, 221; 707/8, 200; 719/316, 719/327; 715/762, 514
See application file for complete search history.

(56) References Cited

U.S. PATENT DOCUMENTS

| | | | | |
|---|---|---|---|---|
| 4,974,151 A | * | 11/1990 | Advani et al. ................. 710/8 |
| 5,778,226 A | * | 7/1998 | Adams et al. ............... 719/311 |
| 5,809,329 A | * | 9/1998 | Lichtman et al. ............... 710/8 |
| 6,185,733 B1 | * | 2/2001 | Breslau et al. .............. 717/163 |
| 6,922,813 B1 | * | 7/2005 | Korenshtein ................. 715/762 |
| 7,024,427 B2 | * | 4/2006 | Bobbitt et al. .............. 707/200 |
| 2002/0112232 A1 | * | 8/2002 | Ream et al. ................. 717/176 |
| 2002/0178233 A1 | * | 11/2002 | Mastrianni et al. ......... 709/217 |
| 2003/0009754 A1 | * | 1/2003 | Rowley et al. ............. 717/177 |
| 2003/0023603 A1 | * | 1/2003 | Ellison et al. ................ 707/10 |
| 2003/0046682 A1 | * | 3/2003 | Crespo et al. .............. 717/178 |

\* cited by examiner

*Primary Examiner*—Tuan A Vu
(74) *Attorney, Agent, or Firm*—Arthur J. Samodovitz

(57) ABSTRACT

A computer system and program product for building a server according to specifications. There are a multiplicity of program objects to install a respective multiplicity of programs on the server. First program instructions determine a plurality of the program objects which currently have prerequisite software and parameters for their respective applications. Second program instructions concurrently invoke the plurality of program objects. At least one of the plurality of program objects, after execution, invokes another of the program objects, supplying a prerequisite parameter for the other program object.

10 Claims, 4 Drawing Sheets

AUTOMATIC CONFIGURATION OF A SERVER

BACKGROUND OF THE INVENTION

Figure 1:
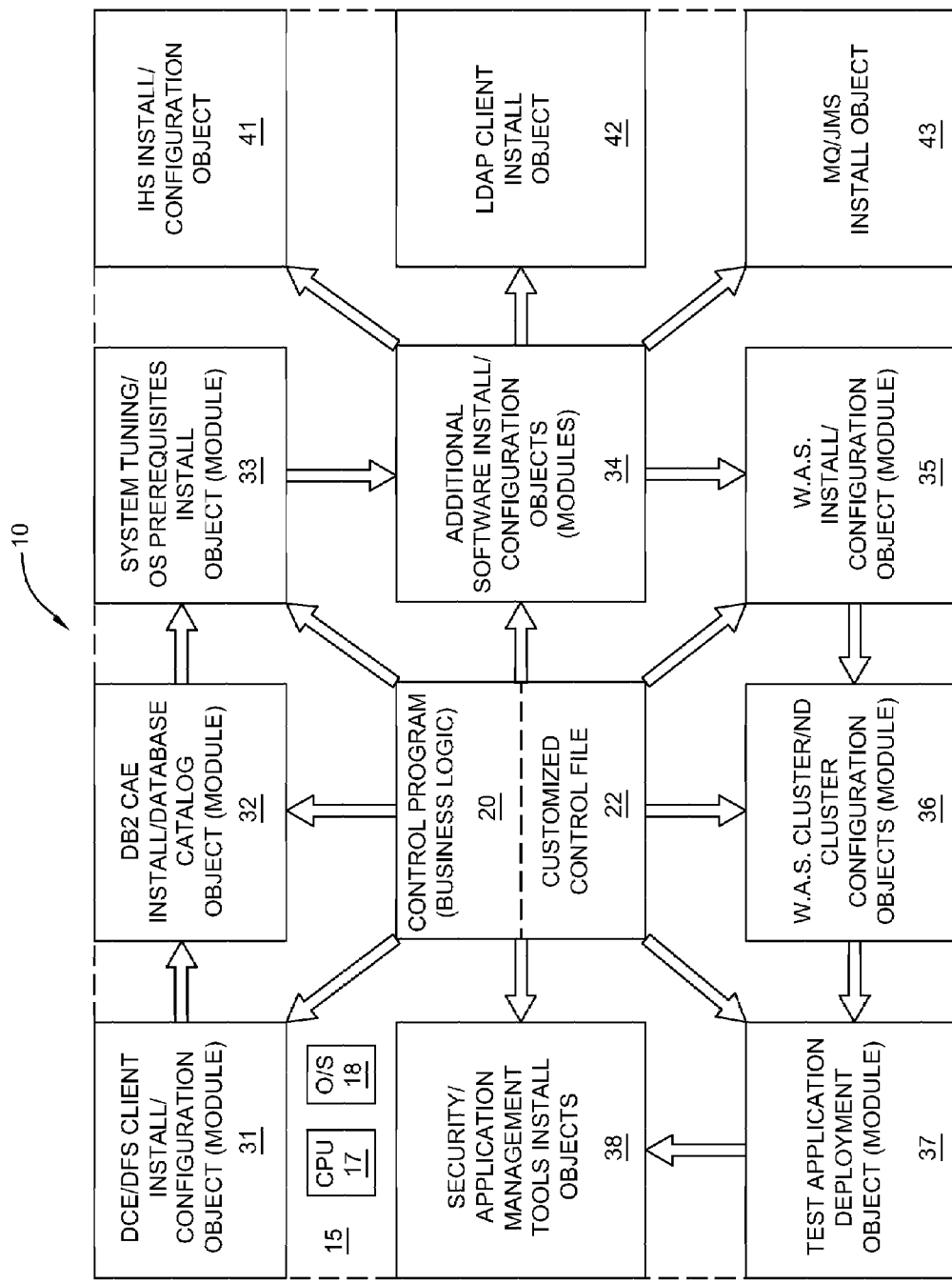

The invention relates generally to computer systems, and deals more particularly with a technique to automatically build a server.

Computer servers are widely used today, either as an independent server or part of a cluster of servers. Servers can be coupled to client workstations via a wide variety of networks such as LAN, WAN, token ring, intranet, internet, etc. Such coupling can use a wide variety of communication protocols such as TCP/IP,UDP and SMTP. Servers can perform a variety of function for the clients, such as management of data, Web Services, User Authentication and Process Messaging. Servers are clustered to pool their resources for the clients. This can be done for load balancing. Typically, a load balancing program is used to assign a server to each work request based on availability of the server. Clustering of servers also provides fault tolerance because other servers in the cluster are available if one fails.

A server must be "built" before it can be used alone or as part of a cluster. This "building" requires some or all of the following activities:

a) loading the requisite operating system and applications,
b) loading parameters into the applications,
c) assigning IP addresses,
D) assigning cluster topology,
E) assigning distributed database parameters,
F) assigning distributed file system parameters, and
G) assigning Distributed Computing Environment Security/Authentication parameters.

Currently, a systems administrator builds the server. The content of the server is based on choices made by the systems administrator (based on the customer's perceived needs) and the customer itself. This building process is time consuming, and prone to human error.

Accordingly, an object of the present invention is to automate the process of building a server.

SUMMARY OF THE INVENTION

The invention resides in a computer system and program product for building a server according to specifications. There are a multiplicity of program objects to install a respective multiplicity of programs on the server. First program instructions determine a plurality of the program objects which currently have prerequisite software and parameters for their respective applications. Second program instructions concurrently invoke the plurality of program objects. At least one of the plurality of program objects, after execution, invokes another of the program objects, supplying a prerequisite parameter for the other program object.

According to one feature of the present invention, the parameter supplied by the other program object was generated by the application installed by the other object.

According to another feature of the present invention, a first one of the plurality of program objects installs distributing computing software, a second one of the plurality of program objects installs data base management software and a third one of the plurality of program objects installs prerequisite software for WWW server software.

DETAILED DESCRIPTION OF THE PREFERRED EMBODIMENTS

Referring now to the drawings in the detail, wherein like reference numbers indicate like elements throughout, FIG. 1 illustrates a server-build program suite generally designated 10 according to the present invention. Program suite 10 executes in a server 15 being built. Server 15 has a CPU 17 and a prerequisite operating system and other software 18 to run program suite 10. Program suite 10 comprises a control program 20 and associated control file 22 and program installation and configuration objects 31-38 and 41-43. To generate the control file 22, control program 20 prompts the customer and/or systems administrator to specify various, desired applications for server 15 such as specific types of distributed database, distributed file system, distributed computing environment, and network cluster to be a member. Control program 20 also prompts the user to specify for each application to be installed, what are the prerequisite software and parameters. Control program 20 then prompts the customer and/or systems administrator to enter parameters for the applications to be installed, to the extent the customer and/or systems administrator knows them. Examples of parameters that can be entered by a systems administrator are DCE/DFS cell name/address, data base server name/address, LDAP cluster name/address, distributed directory name/path, and network dispatcher name/address. The choices of applications to be installed, list of requisite software and parameters specified by the user, and the user entered parameters are then stored in control file 22.

Control program 20 also invokes some of the program objects (those for which (a) the prerequisite software is currently running for the application associated with each object and (b) the prerequisite parameters are currently stored in the control file 22 for the application associated with each object). The program objects invoked by the control program may also invoke other program objects which are dependent on the program objects invoked by the control program 20. These other program objects may in turn invoke other program objects, etc. until all the desired applications are installed, as described below to build server 10. Depending on the choices made by the customer and/or systems administrator as to the application content of server 10, some of the objects 31-38 and 41-43 may not be invoked. Only those objects needed to install the applications specified in the control file and prerequisite software are invoked.

In the illustrated example, objects 31-38 and 41-43 are as follows. Object 31 installs and configures a DCE/DFS (Client) program, Object 32 installs a DB2 CAE data base management program, and object 33 installs operating system and other system software pre-requisites. Object 34 invokes objects 41-43 to install and configure "additional software" specified by the systems administrator and/or customer and recorded in file 22. Object 41 installs IBM HTTP Server ("IBM") software, object 42 installs IBM Lightweight Directory Access Protocol ("LDAP") software, and object 43 installs IBM MQSeries/Java Messaging Services ("JMS") software. Object 35 installs and configures a WWW server application such as Websphere Application Software ("WAS") which handles requests for web pages. Object 36 configures the network for server 15 to be part of a cluster of servers, object 37 installs bench marking software, and object 38 installs security management tools. By way of example, program suite 10, based on control file 22, builds/enhances server 15 into an IBM WebSphere Application Server (WAS) server and includes server 15 in a WAS cluster of servers, although the present invention can be used to build other types of servers in other types of environments as well. Objects 31-38 and 41-43 and the programs they install and configure will be described in more detail below.

Figure 2:
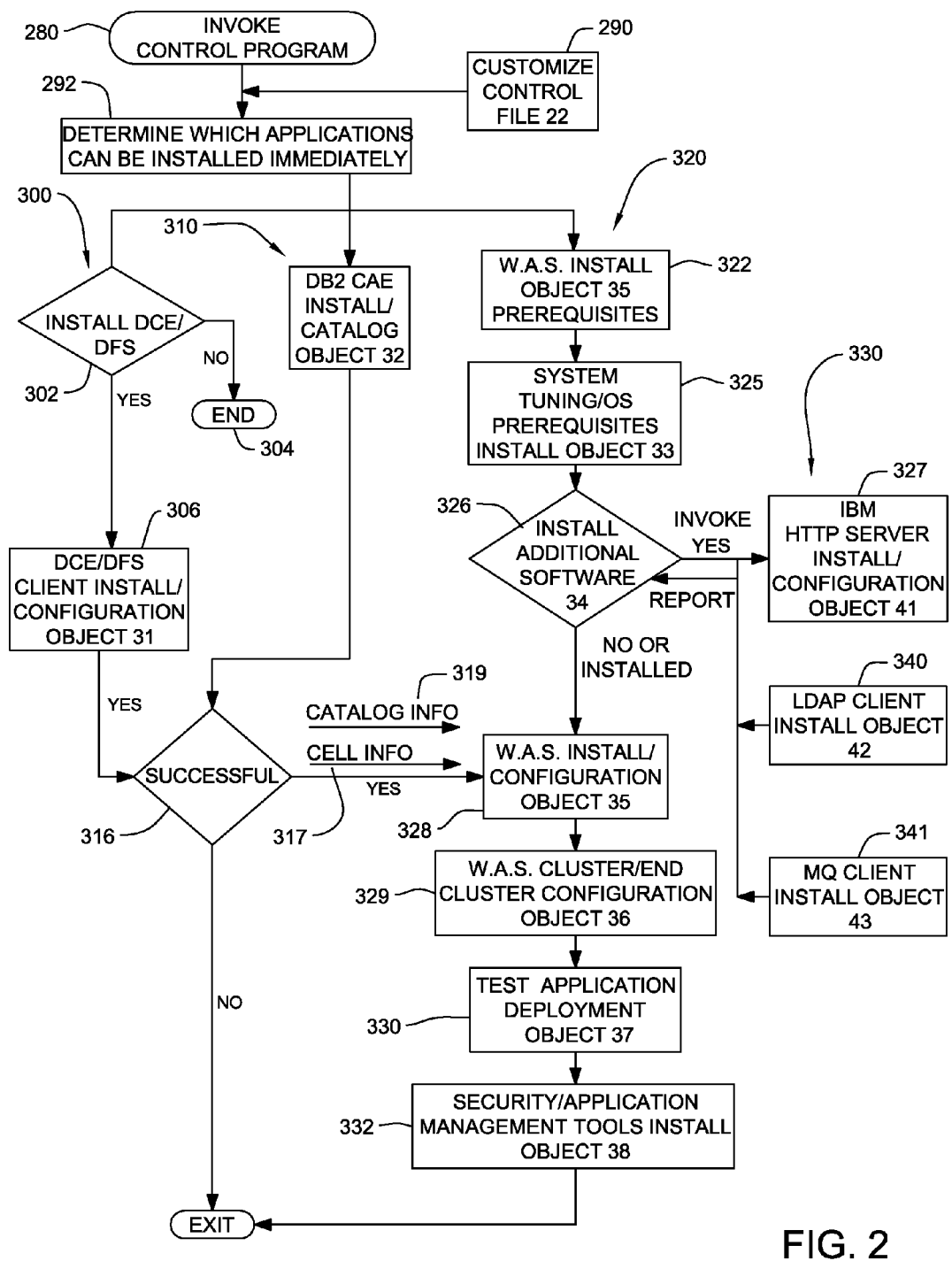

FIG. 2 is a flow chart illustrating the sequence and synchronization of the server build objects 31-38 and 41-43. Initially, control program 20 is invoked (step 280) and prompts the customer and/or systems administrator to input the control file 22 the list of applications to be installed, list of prerequisite software and parameters for each application to be installed, and known parameters for the applications to be installed (step 290). Next, the control program determines which applications selected for installation by the customer and/or systems administrator can be installed immediately without waiting for any prerequisite software to be installed or any new parameters to be entered (step 292). This determination is made as follows for each application to be installed. Control program 20 determines from control file 22 the prerequisite software and parameters for the application. Then control program 20 checks the server's currently installed software database to determine if all the prerequisite software is currently running, checks control file 22 for the prerequisite parameters and validates the prerequisite parameters for the application. If all the prerequisite software for the application is currently running and all the prerequisite parameters are available from the control file 22 or elsewhere, then control program 20 immediately invokes the respective installation object for the application. If there are more than one application that can be installed immediately, without any unsatisfied prerequisites, then the installations objects for all such applications can be and are preferably invoked in parallel, by multitasking or other such technique. In the illustrated example, all the pre-requisites for DCE/DFS, DB2 CAE and WAS Prerequisite applications are satisfied. Therefore, control program 20 immediately invokes objects 31, 32 and 35 in parallel in processes 300, 310 and 320, respectively. As described below, objects 33, 34, 36, 37 and 38 will also execute subsequently in process 320. Also, as described below, another process 330 will be created to execute objects 41, 42 and 43 after objects 35 (initial portion), 33 and 34 are executed.

In process 300, the control program 20 checks the control file 22 to determine if the DCE/DFS client program should be installed in server 15 (decision 302). If not, then the process 300 terminates (step 304). If so, the control program invokes the object 31 to install DCE/DFS client program in server 15 (step 306). When this installation is complete, process 300 notifies process 310 (as an input for decision 316), and passes cell information 317 to Object 35. This "cell" information 317 comprises Distributed File system for "WAS" application software container and Users access control information for the application software.

In process 310, control program 20 invokes object 32 to install DB2 CAE software (step 312). Because DB2 CAE software is a prerequisite for WAS, DB2 CAE software is specified in the control file as a default, and its installation cannot ordinarily be avoided by the customer and/or systems administrator. In the illustrated example, the only control by the customer and/or systems administrator on the DB2 CAE software are parameters such as "WAS" Repository Database, "WAS" Session Database and "WAS" application database. After the DB2 CAE software has been successfully installed and the DCE/DFS Client program has been successfully installed, if specified (decision 316), then process 310 notifies object 36. Object 32 also passes data base catalog information 319 to object 35. Catalog information 319 comprises a remote database that has been cataloged locally and tested for connectivity to the database.

In process 320, control program 20 invokes object 35 to install WAS prerequisites (step 322). The first step in the installation is to identify the prerequisite operating system and other system software and parameters. This identification is performed by object 35 checking control file 22 to learn the prerequisite software and parameters needed for WAS. Then, object 35 invokes object 33 to install the prerequisite system software (step 325). Object 35 passes to object 33 as parameters the name of the TCP/IP interface and service port. Next, object 33 checks the control file 22 to determine if there is additional software to be installed (decision 326). If so, object 33 invokes additional objects to install the additional software. In the illustrated example, the additional software is IHS, LDAP Client and MQS/JMS software. Object 33 also passes to object 41 as parameters prerequisites for installing software and system environment variables (e.g. OS level graphic configurations). So respective installation objects 41, 42 and 43 are executed in sequence in process 330 to install the respective additional software (steps 327, 340 and 341) with object 41 passing to object 42 successful installation of IHS Client and Web Server communication port parameters, and object 42 passing to object 43 an indication of successful installation of LDAP client software parameters. Process 320 will not proceed to step 340 until all the additional software has been installed (and configured when required). After installation (and configuration) of all the additional software, process 330 and object 43 pass an indication of successful installation of MQ client and MQ Java Archive File (JAR) parameters to object 35 and notifies process 320.

WAS itself cannot be installed and configured until (i) the WAS system pre-requisites have been installed (step 325), (ii) the additional software has been installed (steps 327-329), (iii) DB2 CAE has been installed (step 312), and (iv) DCE/DFS Client program has been installed, if specified in the control file 22 (step 306). So, when these four conditions are met, then object 35 can install and configure WAS in server 15 (steps 326 and 328).

Next, in process 320, object 35 invokes object 36 to configure the server 15 into the cluster 70 (step 329). Object 35 also passes HTTP communication port, Secure Sockets Layer port and boot strap port names as parameters to object 36. Then object 36 invokes object 37 to install the bench marking application (step 330). Object 36 also passes an identity of a fully qualified URL of server 15 and the port for the web browser as parameters to object 36. Finally, object 37 invokes object 38 to install the security application management program (step 332). No parameters are passed except an indication that the security application management program was successfully installed.

In the illustrated example, Distributed Computing Environment/Distributed File systems (DCE/DFS) Client portion, DB2 CAE program and WAS Prerequisite installation are installed first in parallel, although programs of similar or dissimilar function could be installed first as well. In the illustrated embodiment, control program 20 invokes DCE/DFS Client Install/Configuration Object 31, DB2 CAE Install/Database Catalog Object 32 and WAS Install/Configuration Object 35 first and passes relevant parameters to these objects from file 22.

"DCE/DFS" is a computer program suite licensed by IBM. It comprises a program that runs in a client and a program that runs in a server. At both the client and server, DCE/DFS includes a software layer between an operating system/network interface and a distributed application. The client and server portions of DCE/DFS together provide a variety of common services needed by distributed applications, such as identifying a communication hub or "cell" for server 15 (in the role of a "client"), synchronizing files between the cell and server 15, providing security for files managed by the cell and providing a standard remote procedure call interface for the distributed applications on server 15. With this standardized interface, the distributed application on server 15 need not be written for a variety of different interfaces. Thus, DCE/DFS supports distributed applications which were written in a simplified manner, i.e. distributed applications for which the underlying network architecture is transparent. (Examples of distributed applications supported by DCE/DFS are Websphere Application Server, IBM HTTP Server, DB2, LDAP and MQ.

Some of the parameters passed from control file 22 to Object 31 identify the "cell". Other of the parameters specify Distributed file system that will be required for the application code and Web user access control on the application code. The DCE/DFS Installation object 31 installs the DCE/DFS client program in server 15 with the parameters. This installation is automatically performed by object 31 as follows:

a. Install DCE/DFS Client software code on local node,
b. Start DCE/DFS client full configuration process,
c. Register client to Master Security Server,
d. Enable DFS client cache on local disk,
e. Initialize DCE RPC Authentication level for communications between the cache manager and file servers within the same cell.

The cell already includes the DCE/DFS server program, so no installation is required there by object 31.

As explained above, control program 20 also recognizes from the control file and its sequencing algorithm that a data base management program such as IBM DB2 data base management program should/can be installed concurrently with the installation of DCE/DFS client program. So, object 31 invokes DB2 Client Application Enabler (CAE) Install/Catalog Configuration object 32 and passes the associated parameters from control file 22. Object 32 begins by loading IBM DB2 client management software on server 15. (For purposes of this software, server 15 plays the role of a client, and the remote database server plays the role of a server.) The parameters obtained from the control file 32 identify the names of the actual, remote data bases used by server 15, such as TradeSample application database, WAS Admin Repository database and a Session database. TradeSample application data base is used as a bench marking application which will test the functionality of Websphere Application server. WAS Admin Repository data base is used for Websphere Application server configuration data. Session data base is used for Web users browser session data.

Next, object 32 creates a DB2 client virtual database instance on server 15 for each of these remote data bases. The local, virtual data bases do not include the actual data, but instead are links to the actual, remote data base. The links are denoted by "catalogs" of the remote data bases, i.e. the names, locations and addresses of the remote data bases and the corresponding names and addresses used locally for the application to query database.

Next, Object 32 configures remote database by setting up TCP/IP service ports. These ports are used by server 15 to access the actual, remote data base using TCP/IP communications. Next, object 32 tests connectivity to these database by sending a SQL command to each of the remote data bases and checks whether a proper response is received.

Finally, the object 32 passes the locally cataloged database information to a WAS Install/Configuration object 35, as described below.

As explained above, control program 20 also recognizes from the control file and its sequencing algorithm that World Wide Web server software such as IBM WebSphere Application Server (WAS) software should/can be installed concurrently with the installation of DCE/DFS client program and DB2 CAE software. So, control program 20 invokes object 35. As explained above, before the WAS software can be installed, prerequisite system and application software needs to be installed. So, object 35 checks control file 22 to learn the name of the object to invoke to install the prerequisite system software and the associated parameters. In the illustrated example, the next object to call is System Tuning/Operating System Prerequisites Install object 33. The associated parameters are the names of prerequisite system software, system variables and names of additional software to be subsequently installed. The system variables include parameters needed for the additional software to run on the operating system. Examples of system variables are X11 package, Xlc runtime environment and Unix Language packages. Object 33 checks if server 15 currently has all the prerequisite operating system patches/updates needed to install WAS and additional software, specified in the control file 22. If any are absent, then object 33 fetches them from the Network File System (NFS) mounted on the local server by the object where all patches and fixes resides, and installs them by invoking Unix operating system install program. Object 33 also checks if all network communication services and additional software necessary for WAS are available. If any are absent, then object 33 fetches them from "NFS", and installs them by using systems install program. Object 33 also creates a journal file system for storing the WAS software and the additional software.

Then, object 33, recognizes from the parameters passed earlier from object 35, that additional software needs to be installed next. So, object 33 invokes Additional Software Install/Configuration objects 34 and passes the additional software and the system variables. In the illustrated example, the additional software is IBM HTTP Server ("IHS") software, IBM Lightweight Directory Access Protocol ("LDAP") software and IBM MQSeries/Java Messaging Services ("JMS") software.

The IHS software will allow server 15 to communicate using HTTP protocol. LDAP client software (installed on server 15) is an IBM program which responds to remote client web browser requests by furnishing requested web pages. It does so by authenticating users to an LDAP directory tree.

MQSeries JMS software is a JAVA messaging, middle ware program that interfaces different types of operating systems to each other so that the different operating systems can communicate with each other. To accomplish this, MQSeries JMS software provides a standard communication interface between the different operating systems. The different operating systems use this interface to communicate to other, different operating systems. MQSeries JMS Client software receives JAVA format/protocol messages and converts them to the format/protocol of a different operating system such as IBM MVC operating system. WAS can later use this software for incoming and outgoing messages.

After receiving the notification, list of additional software to install and system variables, object 34 invokes objects 41-43 to install the respective additional software and passes the objects 41-43 the respective system variables. In the illustrated example, there is an installation object 41 for the IHS software, an installation object 42 for the LDAP software and an installation object 43 for the MQSeries JMS software. Objects 41-43 then use the system variables passed from object 34 to install and initialize the respective software on server 15. Object 41 installs and initializes the IHS software. Also, object 41 modifies a web server (for example, IBM HTTP Server) configuration file so that the web server communicates with server 15 using TCP/IP. Object 41 also configures a web server log file within server 15 to have more storage capability. The log file will contain records of what files were accessed by incoming or outgoing messages, errors, etc. Object 41 notifies object 34 when IHS has been installed and initialized. Object 42 installs and initializes the LDAP software. Object 42 also notifies object 34 when LDAP has been installed and initialized. Object 43 installs and initializes the MQSeries JMS software. Object 43 notifies object 34 when MQSeries JMS software has been installed and initialized.

After each of the additional software is installed and initialized, Object 34 returns control to object 35 with an indication that all the prerequisite system software and the additional software has been installed and initialized. Then, object 35 installs the WAS software by user specified WAS software level. Object 35 also installs a package of fixes or individual fixes for WAS software as specified in the control file 22. Once all the WAS software is installed, object 35 will then configure the WAS software as follows. Object 35 will edit all WAS configuration files to indicate a cluster in which server 15 is a member, WAS Cluster and Network Dispatcher. Object 35 also inserts in the configuration files, the following Distributed Database and Distributed file system information: WAS repository database, WAS Session Database, TradeSample Application database and DFS directory path where Application database resides. Then, object 35 will change a startup process for WAS software and IHS software to specify who has Web Administrator access to WAS software.

After object 35 completes its processing, it checks the control file 22 to determine the next object to invoke and the associated parameters. In the illustrated example, this is WAS Cluster and Network Dispatcher Configuration object 36. After object 36 completes the following five tasks, server 15 will be part of a WAS cluster of servers:

a. Insert server configuration parameter to WAS Repository Database,
b. Start WAS bootstrap port to communicate will other WAS server in the cluster,
c. Alias Network Dispatcher's IP to its communication interface,
d. Add END assigned IP address to an IHS configuration file and a WAS configuration file, and
e. Initialize WWW port (80) and Secure Socket Layer (SSL) port (443) to an IHS and WAS configuration file.

Object 36 loads the WAS cluster/eND Cluster Configuration program. Then, object 36 configures WAS on Network Dispatcher 80 to group server 15 as part of a cluster of servers. This configuration of Network Dispatcher 80 comprises recording the IP address of server 15 and other members of the cluster and initializing a port for listening for web request. Object 36 also configures WAS on an Administrative Domain cluster. The Administrative Domain cluster performs the following functions: communicate between other WAS servers, load balancing between other WAS servers and performing administration functions between other members of the cluster.

Figure 3:
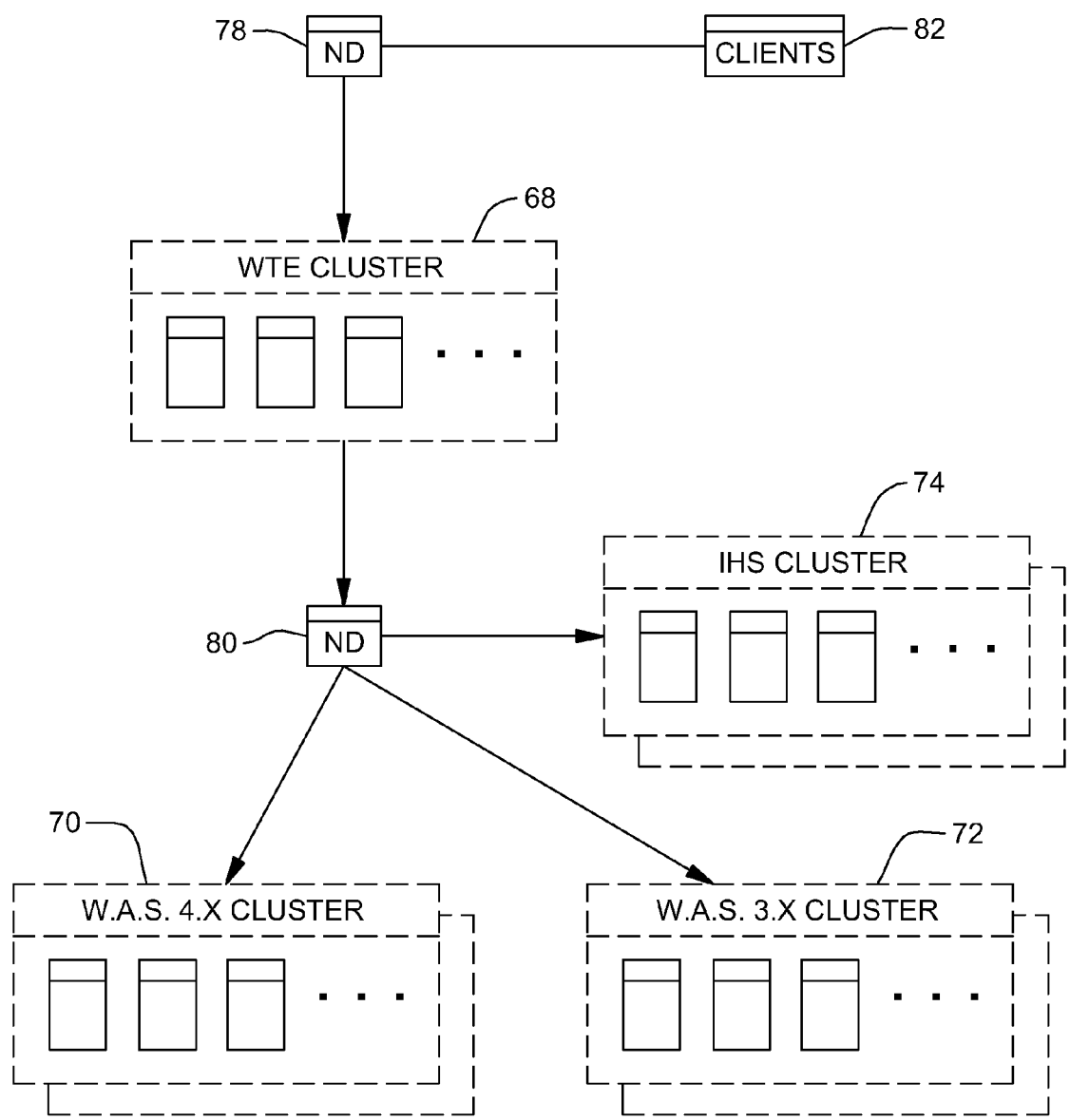

The example of FIG. 3 illustrates a WAS cluster configuration of server 15. In FIG. 3, there is a network dispatch server 78 that receives HTTP requests from a client 82 for web pages. After receiving such a request, network dispatch server 78 determines, based on load balancing, which front end proxy server in Web Transfer Express ("WTE") cluster 68 should process the request. (Network dispatch server 78 will also remove from the cluster 68 any server which is down.) The WTE Cluster server 68 translates the URL in the client request to one of the server clusters 70, 72 or 74, and then forwards to network dispatch server 80 the request with a specification of which cluster 70, 72 or 74 to handle the request. Then, network dispatcher 80, based on load balancing and the form of the available data for the web page, determines which server in the specified cluster 70, 72 or 74 should receive and handle the request to obtain the requested web page. (Network dispatch server 80 will also remove from the clusters 70, 72 and 74 any server which is down.) The servers in the WAS clusters 70 and 72 can retrieve the data needed to form the requested web page, form the web page and then furnish the web page to the client using an IHS function within WAS cluster server. Each server in the clusters 70 and 72 includes WAS/IHS interface software called "WAS Plug in". The servers in the IHS cluster 74 cannot form a web page, but can only fetch and furnish an existing web page in storage. After configuration, server 15 will be part of cluster 70 or 72, and is available along with the other servers in the cluster 70 or 72 to receive and process client requests. Typically, all servers in each of the clusters will be configured in an identical manner. All servers, including server 15, in a cluster will be part of a single WAS administrative domain with a shared administrative repository database.

Each enterprise application that is later installed by a systems administrator on server 15 to run on WAS, will deploy as a single instance. As "single instance" means the applications will run on the system as a unique process. All components of the enterprise application (for example, IBM Java Servlet Pages ("JSP"), IBM Enterprise Java Beans ("EJB") and IBM Servlet components), will deploy in this single instance. Each enterprise application includes a unique session database and application database. A WebSphere Global Security program will be enabled (using LDAP) on all WAS servers in clusters 70 and 72 to authenticate a valid WAS administrator can start and stop WAS process.

Figure 4:
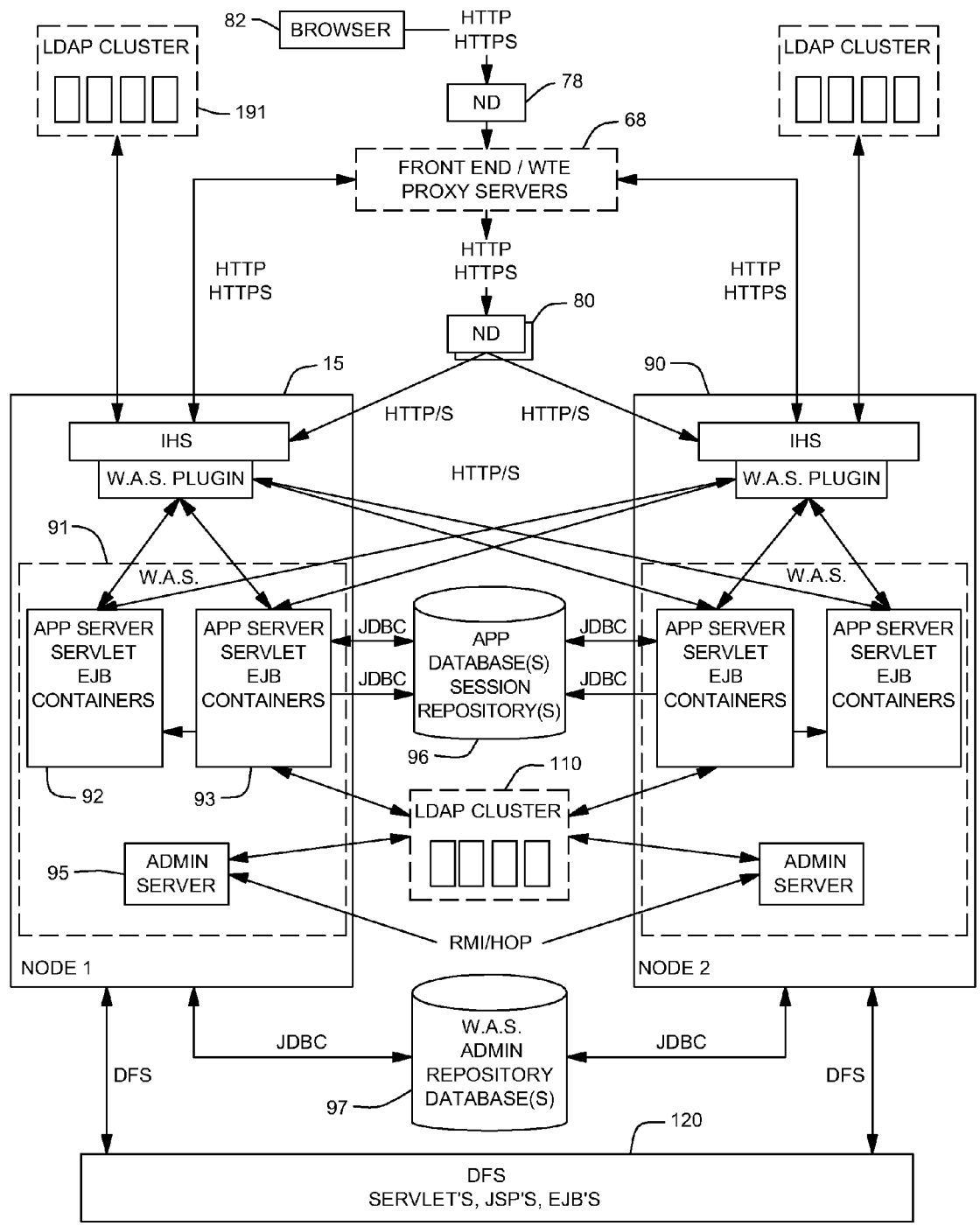

FIG. 4 illustrates servers 15 and 90 within cluster 70 in more detail along with related components. When a client request is received, the IHS software determines, based on configuration data stored in the server or based on the TCP/IP port through which the request is received, if the request is for a secure web page. If so, then the IHS software requests authentication from an LDAP cluster server 191. This authentication may depend on whether the requester is from a registered group authorized to access this web page. If the requester is not authorized, the IHS software returns an error message to the client via the front end proxy server 68. However, if the requester is authorized, then the IHS software passes the request to the proper application 92 or 93 within the WAS software 91. In response, application 92 or 93, using Java Data Base Connectivity ("JDBC"), obtains the data from a data base 96, and creates an HTML frame. Then, application 92 or 93 passes the HTML frame to the IHS software which forwards the HTML frame back to the client via front end proxy server 68.

FIG. 4 also illustrates program functions to initiate applications 92 and 93. When a systems administrator requests to initiate application 92 or 93, an Administrative Server function 95 within WAS software 91 checks with an LDAP server 110 whether the systems administrator has authority to initiate the application and whether the server is configured for this application. WAS Administrative repository 97 stores the configurations of the applications and server 15 for use during this determination and loading of the application. FIG. 4 also illustrates a Distributed File Service ("DFS") 120 which stores the applications 92 and 93 for subsequent installation in servers 15 and 90. Each of the servers can also store temporary files in DFS to be read by the other server.

After Object 36 completes is processing, it checks the control file 22 to determine the next object to invoke and the associated parameters. In the illustrated example, this is Test Application Deployment object 37. Object 37 installs and configures a benchmark application such as IBM TradeSample application on server 15, as follows. First, object 37 installs the TradeSample application code and content on a WAS Install/home directory. Then, object 37 imports a TradeSample Application Server configuration and a Trade-Sample Enterprise Application Configuration from predefined configuration file to the WAS software. Then, object 37 configures an IHS configuration file and a WAS configuration file to accommodate the TradeSample application.

After object 37 completes is processing, it checks the control file 22 to determine the next object to invoke and the associated parameters. In the illustrated example, this is Security/Application Management Tools Install object 38. Object 38 prepares the operating system, such as AIX, of server 15 for basic security compliance. The security compliance parameters were previously specified by the customer and/or systems administrator and are contained in the control file 22 as parameters. The operating system is prepared for security compliance by controlling who has authority to access certain functions and data bases, DFS directory and LDAP directory. Object 38 also installs WAS startup and shutdown scripts that will allow a support team to administer WebSphere Applications.

Based on the foregoing, a program suite for building a server has been disclosed in accordance with the present invention. However, numerous modifications and substitutions can be made without deviating from the scope of the present invention. For example, a wide variety of system and application software can be installed, configured and initialized with the present invention. Therefore, the present invention has been disclosed by way of illustration and not limitation, and reference should be made to the following claims to determine the scope of the present invention.

The invention claimed is:

1. A computer program product for installing applications on a server, said program product comprising:
   a computer readable storage medium;
   a multiplicity of program objects to install a respective multiplicity of the applications on said server;
   first program instructions to determine a plurality of said program objects which currently have prerequisite parameters to install their respective applications; and
   second program instructions to invoke said plurality of program objects; and wherein
   one of said plurality of program objects installing one of said applications and based on the installing of said one application generating a prerequisite parameter needed to install another of said applications, identifying and invoking another of said program objects to install said other application, and supplying to said other program object said prerequisite parameter needed to install said other application, and in response, said other program object installing said other application using said prerequisite parameter needed to install said other application; and
   said program objects and said first and second program instructions are recorded in functional form on said computer readable storage medium to support installation by said plurality of program objects of their respective applications in said server and support installation by said other program object of said other application in said server.

2. A computer program product as set forth in claim 1 further comprising third program instructions to prompt a user to furnish parameters for said plurality of program objects; and wherein said third program instructions are recorded on said computer readable storage medium.

3. A computer program product as set forth in claim 1 wherein a first one of said plurality of program objects installs distributing computing software, a second one of said plurality of program objects installs data base management software and a third one of said plurality of program objects installs prerequisite software for WWW server software.

4. A computer program product as set forth in claim 1 wherein one of said program objects, during installation of one of said applications, configures a remote database by setting up a TCP/IP port on said server, said port to be used by said server to access said remote database using TCP/IP communications, said one program object testing connectivity to said remote database via said port by sending a signal to said remote database via said port and determining if a response is received.

5. A computer program product as set forth in claim 4 wherein said one program object passes locally cataloged database information, corresponding to said remote database, to another of said program objects for use in installing another of said applications.

6. A computer system for installing applications on a server, said system comprising:
   a processor;
   a computer readable storage media;
   a multiplicity of program objects, recorded on said computer readable storage media for execution by said processor, to install a respective multiplicity of applications on said server; and
   means for determining a plurality of said program objects which currently have prerequisite parameters to install their respective applications on said server; and
   means for invoking said plurality of program objects; and wherein
   one of said plurality of program objects installing one of said applications and based on the installation of said one application generating a prerequisite parameter needed to install another of said applications, identifying and invoking another of said program objects to install said other application, and supplying to said other program object said prerequisite parameter needed to install said other application, and in response, said other program object installing said other application using said prerequisite parameter needed to install said other application.

7. A system as set forth in claim 5 further comprising means for prompting a user to furnish parameters for said plurality of program objects.

8. A system as set forth in claim 5 wherein a first one of said plurality of program objects installs distributing computing software, a second one of said plurality of program objects installs data base management software and a third one of said plurality of program objects installs prerequisite software for WWW server software.

9. A computer system as set forth in claim 5 wherein one of said program objects configures a remote database by setting up a TCP/IP port on said server, said port to be used by said server to access said remote database using TCP/IP communications, said one program object testing connectivity to said remote database via said port by sending a signal to said remote database via said port and determining if a response is received.

10. A computer program product as set forth in claim 9 wherein said one program object passes locally cataloged database information, corresponding to said remote database, to another of said program objects for use in installing another of said applications.

* * * * *